March 17, 1931.  R. W. GUNN ET AL  1,796,455
BALL VALVE ASSEMBLY
Filed Dec. 27, 1927
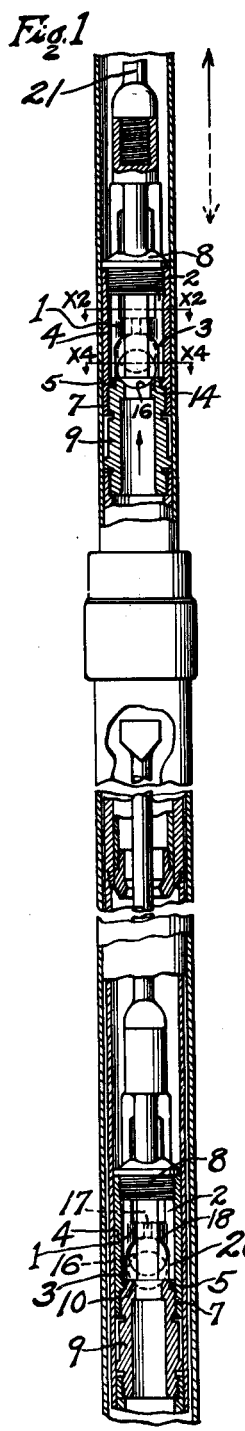
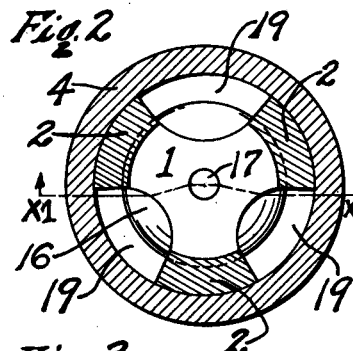
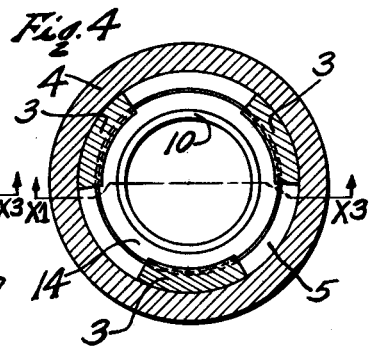
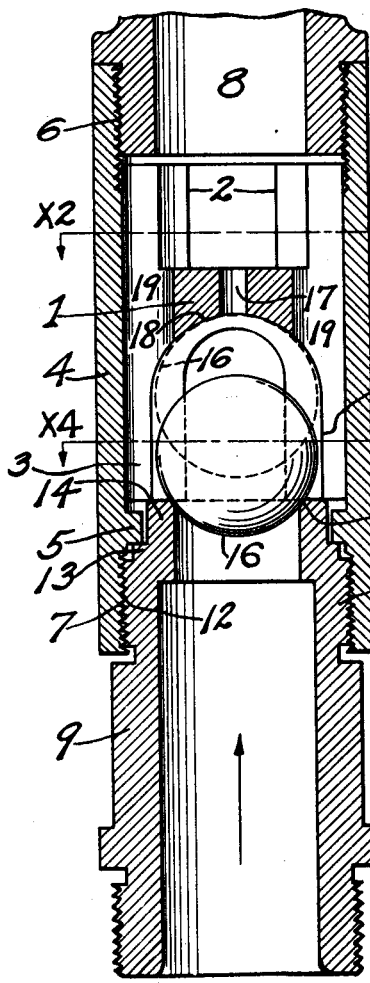
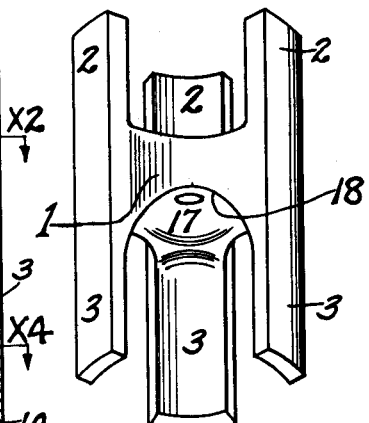
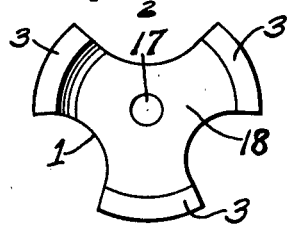
INVENTORS
ROBERT W. GUNN
WILLSIE A. SCOTT THOMPSON Patented Mar. 17, 1931

1,796,455

UNITED STATES PATENT OFFICE

ROBERT W. GUNN AND WILLSIE A. SCOTT THOMPSON, OF LOS ANGELES, CALIFORNIA, ASSIGNORS, BY MESNE ASSIGNMENTS, TO EMSCO DERRICK & EQUIPMENT COMPANY, OF LOS ANGELES, CALIFORNIA, A CORPORATION OF CALIFORNIA

BALL-VALVE ASSEMBLY

Application filed December 27, 1927. Serial No. 242,624.

An object of this invention is to provide an improvement in that type of ball valve constructed with a valve seat located at one end of a sleeve in which the valve ball works; and it includes a novel accessory adapted for separate manufacture and sale, and to be inserted in the sleeve; and comprises a combination valve ball stop and guide; and the invention also includes the ball valve made up with said accessory in combination with other parts pertaining to valve construction.

The invention is applicable to valves for various purposes but more particularly relates to the ball valves of oil well pumps, constructed with a blind cage combination for pump valves, set forth in our United States Letters-Patent No. 1,530,827, granted March 24, 1925, in which there are combined a valve seat and a sleeve provided above the valve seat, with a bridge or stop to intercept the valve ball when such ball is unseated.

The invention is applicable to forms of ball valves in which a stop is provided for an unseated ball, working in a sleeve surrounding the valve ball and fluid passage.

It is found that in valves of this kind, there is a tendency for the valve ball to wear its seat unevenly and that such uneven wear usually occurs more positively in one or more places at the side of the seat and sleeve in which the unseated ball moves.

An object of this invention is to prevent such wear, and more particularly, to insure the invariable seating of the ball so centrally relative to its seat, as to avoid the wear heretofore produced by a valve ball working in a cylindrical sleeve of common type.

An object is to provide a cheap and simple article of manufacture affording means, easily made and easily applied, that will prevent the wear on the ball seat and sleeve, in ball valves.

The invention is broadly new, basic and pioneer and includes a ball valve accessory comprising a combined ball stop and guide constructed independently of the valve structure, and adapted to be inserted into a valve sleeve, and provided with a plurality of legs and a ball-intercepting bridge or stop carried by the legs and positioned to space the bridge from the seat and to form ways that guide the ball in its course from the ball seat to the stop and vice versa.

Preferably the bridge construction, or valve ball bumper, intercepter, or stop with legs on one face thereof is in the form of a tripod, and the inner faces of the legs are grooved and are symmetrically disposed in a circle of slightly greater diameter than the ball so that the ball is free to pass from the valve seat toward the bridge and return, and will be directed in a practically straight path and without contact with the walls of the sleeve, and cannot return so eccentrically as to hammer or wear the valve seat in such manner as to deform it.

As in our patented construction above referred to, the sleeve is provided with an annular internal shoulder against which the valve seat member is screwed home, and our newly invented ball guide appliance is constructed to fit friction tight in the sleeve and to be adjustable toward and from the shoulder but it is of greater diameter than the orifice of the shoulder so that it may be assembled in the sleeve by inserting it into one end thereof but, by reason of the shoulder cannot pass through; and the ends of the legs may be in contact with the valve seat member inserted in the sleeve, but is free for adjustment by such valve seat relative to the collar.

An advantage is ready application of the accessory and increased life of the valve.

An object is to minimize the number of parts that have to be handled in field work and we have shown a combined plunger bushing and valve seat in combination with a blind cage sleeve and detachable ball valve bumper, so that in field work there are practically only three parts to handle between the sucker rod and the plunger, viz., the blind cage sleeve, the valve ball and the combined plunger bushing and valve seat; while the work of constructing the valve cage has been greatly simplified, and cheapened.

Other objects, advantages and features of invention may appear from the accompanying drawing, the subjoined detailed description and the appended claims.

The accompanying drawing illustrates the invention.

Figure 1 is a fragmental elevation in reduced scale partly in axial section on a plane indicated by line x1—x3, Figs. 2 and 4, showing the invention applied in the standing and plunger valves of an oil well pump, the ball of the plunger valve being shown seated and that of the standing valve unseated, as by oil, on an up stroke of the pump plunger, which up stroke is indicated by a solid arrow; the dotted arrow and dotted positions of the valve balls indicate the down stroke and the ball positions at such stroke.

Fig. 2 is a cross section on line indicated at x2, Figs. 1 and 3.

Fig. 3 is a fragmental axial section in a plane analogous to that of Fig. 1, showing the ball valve closed as by gravity and on an up stroke of the plunger, line x1—x3, Figs. 2 and 4, indicating the plane of section, and the large arrow indicating the direction of movement of the plunger in Fig. 1.

Fig. 4 is a cross section on line indicated at x4, Figs. 1 and 3, looking down and omitting the valve ball.

Fig. 5 is a perspective view of the ball guide and bumper accessory detached.

Fig. 6 is a bottom plan view of the accessory shown in Fig. 5.

The detachable combined valve ball guide and bumper comprises a central bridge 1 and upper and lower limbs 2, 3 adapted to be mounted within and to fit in the blind cage sleeve 4 that is shown provided with the annular shoulder 5 near one end and with the threaded seats 6, 7 at the upper and lower ends, to receive a sucker rod connection indicated at 8, and the plunger bushing 9, respectively, which bushing is shown provided at its upper end with a valve seat 10 and is provided with a threaded neck 12 screwed into the threaded seat 7 and thus connected to the sleeve 4; and is also provided with an annular shoulder 13 to butt against the shoulder 5 of the sleeve and with an upward annular tip 14 in which the valve seat 10 is formed to receive the valve ball 16.

The upper limbs 2 cooperate with the lower limbs 3 and the sleeve to maintain the bridge in true position and to strengthen the bumper formed thereby, and also to prevent vibration.

The bridge is shown provided with a central vertical bore 17 and with a concavity 18 to fit the valve ball at the end of its unseated movement.

The combined guide and bumper or ball intercepter is provided between the limbs, and past the bridge with concavities forming fluid passages 19 that accommodate the fluid as the plunger descends toward the standing valve 20 that supports the oil on the down stroke of the plunger.

The operation and the methods of manufacture, and the operations necessary for assembly, disassembly and repair, are apparent from the foregoing and will be readily understood by those skilled in the art, without further illustration or explanation. It is understood that the connection with the sucker rod 21 may be by any approved means.

The accessory can be drop-forged, and there is no strain upon the same during the up stroke of the pump, and on the down stroke it chambers the ball with minimum shock regulated by the hydraulic check of the liquid above the ball.

We claim:

1. In combination in a pump used for pumping oil: a tubular member for said pump having a sleeve, shoulders at opposite ends of said tubular member, and openings through said shoulders, said tubular member acting as a conduit for oil; a bridge in said sleeve, said bridge having arcuated faces for engaging the inner surface of said sleeve and channels formed between said arcuated faces; legs extending from said bridge in alignment with said arcuated faces, said legs having outer arcuated faces for engaging said sleeve; a ball enclosed by said legs; and second legs extending from said bridge in alignment with but in an opposite direction to said first-named legs, said second legs having arcuated faces for engaging said sleeve.

2. In combination in a pump used for pumping oil: a tubular member for said pump having a sleeve, shoulders at opposite ends of said tubular member, and openings through said shoulders, said tubular member acting as a conduit for oil; a bridge in said sleeve, said bridge having spaced channels formed in the periphery thereof to permit fluid to flow therearound; legs extending from said bridge in offset relation to said channels so that spaces between said legs align with said channels in said bridge, said legs having outer arcuated faces for engaging said sleeve; a ball enclosed by said legs; and second legs extending from said bridge in alignment with but in an opposite direction to said first-named legs, said second legs having arcuated faces for engaging said sleeve.

3. As a new article of manufacture, a guide and bumper for ball valves comprising a bridge having a centrally disposed bore extending therethrough, and a seat on its lower surface surrounding said bore, and legs extending from said bridge in opposite directions and having arcuated outer faces and concave inner faces.

4. As a new article of manufacture, a guide and bumper for ball valves comprising a body having an intermediate bridge portion and legs extending in opposite directions therefrom, a bore extending through said bridge portion surrounded by a valve seat, the said legs extending from the bridge portion having arcuated outer faces and inner concave faces.

In testimony whereof, we have hereunto set our hands at Los Angeles, California, this 13th day of Dec., 1927.

ROBERT W. GUNN.
WILLSIE A. SCOTT THOMPSON.